United States Patent [19]

Liagre et al.

[11] Patent Number: 5,657,706

[45] Date of Patent: Aug. 19, 1997

[54] APPARATUS FOR PROCESSING AND VITRIFYING WASTE

[75] Inventors: François Liagre, Le Perreux; Claude Bourdil, Sartrouville; Jean-Marie Brochot, Lyons; Pierre Bozetto, Saint Cyr Au Mont D'Or; Jean Cabardi, Miribel; Alain Ensuque, Francheville, all of France

[73] Assignee: Electricite de France (Service National), France

[21] Appl. No.: 537,668

[22] PCT Filed: Apr. 15, 1994

[86] PCT No.: PCT/FR94/00426

§ 371 Date: Feb. 12, 1996

§ 102(e) Date: Feb. 12, 1996

[87] PCT Pub. No.: WO94/24060

PCT Pub. Date: Oct. 27, 1994

[30] Foreign Application Priority Data

Apr. 16, 1993 [FR] France .................... 93 04509

[51] Int. Cl.[6] .................................................. F23K 3/14
[52] U.S. Cl. ................................ 110/250; 110/346
[58] Field of Search ............................ 110/235, 236, 110/237, 250, 346; 65/135, 136, 181, 335

[56] References Cited

U.S. PATENT DOCUMENTS

| 2,527,144 | 10/1950 | Meacham | 49/53 |
| 2,636,723 | 4/1953 | Harter | 263/36 |
| 4,113,459 | 9/1978 | Muller | 65/135 |

FOREIGN PATENT DOCUMENTS

| 0035850 | 2/1981 | European Pat. Off. | C03B 3/00 |
| 0137881 | 10/1983 | European Pat. Off. | C03B 3/00 |
| 2692178 | 6/1992 | France | B09B 3/00 |
| WO87/06926 | 5/1987 | WIPO | C03B 5/12 |
| WO93/01141 | 7/1992 | WIPO | C03C 1/00 |
| WO93/02974 | 8/1992 | WIPO | C03B 5/187 |

Primary Examiner—Henry A. Bennett
Assistant Examiner—Pamela A. O'Connor
Attorney, Agent, or Firm—Blakely Sokoloff Taylor & Zafman

[57] ABSTRACT

The invention relates to apparatus for processing waste, in particular hospital waste, the apparatus including a gasification chamber (1) into which the waste is inserted to be subjected to degassing and to combustion, a post-combustion chamber (2) for the gases coming from the gasification chamber, and a melting chamber (3) in which the slag coming from the gasification chamber (1) is exposed to high temperature for vitrification purposes.

12 Claims, 1 Drawing Sheet

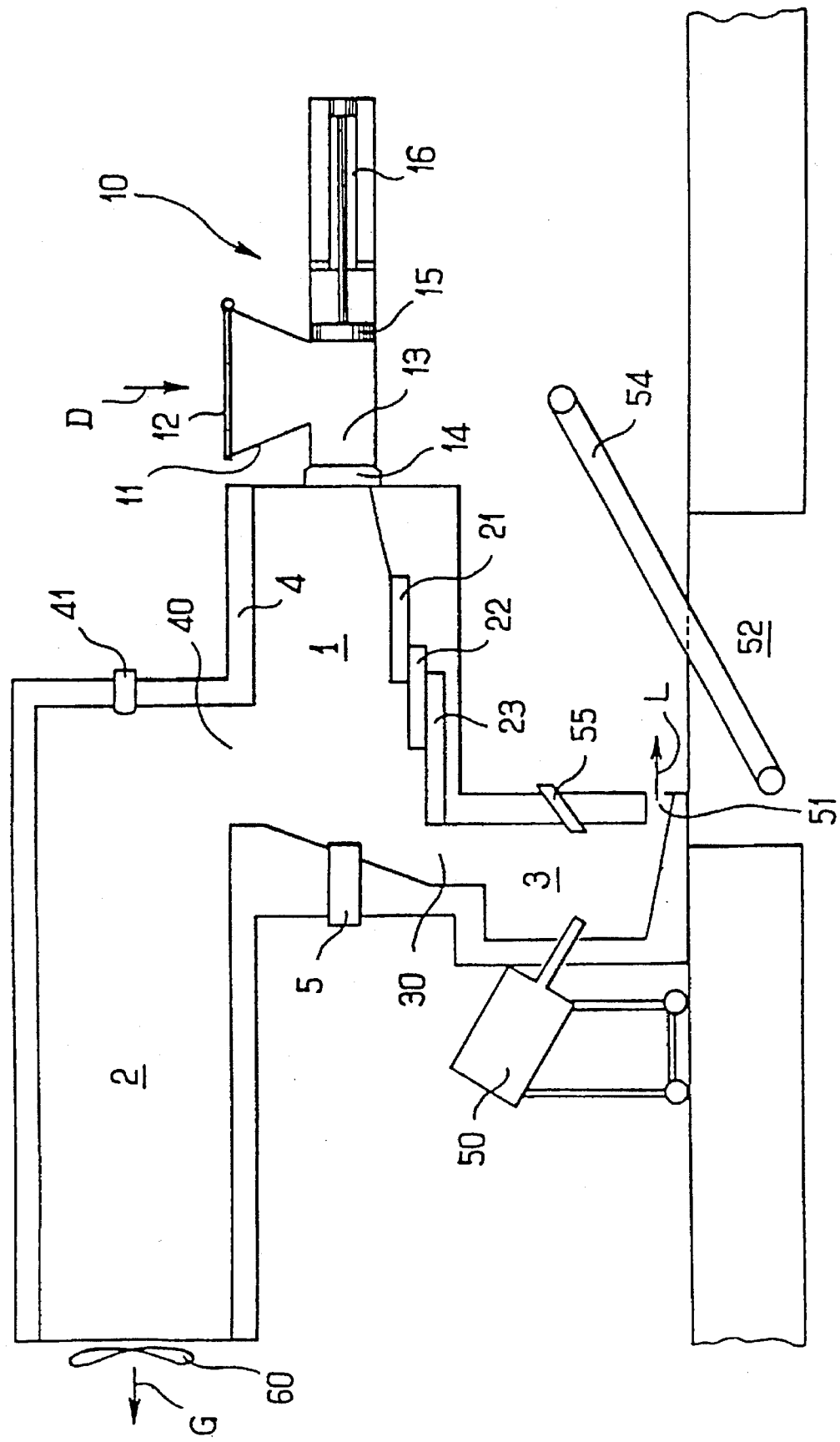
FIGURE UNIQUE

APPARATUS FOR PROCESSING AND VITRIFYING WASTE

BACKGROUND OF THE INVENTION

The present invention relates to apparatus for processing waste, and intended more particularly but not exclusively for processing hospital waste.

In general, hospital waste comprises a wide variety of solid and liquid materials (glasswork, needles, scalpels, chemical substances, biological tissue, . . . ) that may be biologically contaminated or toxic and which must be handled with special precautions, and in particular the waste must be double-wrapped. Hospital waste packaged in this way constitutes batches containing large fractions of volatile substances and having a relatively high lower calorific value (LCV) of 14,600 kJ/kg. This calorific value is nevertheless highly variable and may reach extreme values of 4,200 kJ/kg and 29,000 kJ/kg. In addition, the processing of hospital waste is subject to regulations that require batches of waste to be stored for no more than a short period on the incineration site, and for hygiene reasons, the waste cannot be removed from its packaging prior to incineration in order to make up batches of uniform calorific value. Thus, when incinerating hospital waste, it is necessary to process a succession of batches in which the calorific value varies in a manner that is not known accurately since, in practice, it is not possible for the personnel in charge of incinerating waste to obtain detailed information about the contents of each batch.

SUMMARY OF THE INVENTION

Incinerators are known for destroying household waste in which waste is burned in a hearth fitted with a grid on which the waste is deposited and into which air is injected in order to activate combustion. Such known incinerators are poorly adapted to destroying hospital waste, firstly because of the risk of biologically contaminated liquids running out through the grid or of substances melting that might clog the grid, and secondly because the maximum temperatures reached in such incinerators are less than the temperatures at which steel melts, and as a result metal objects contained in the waste, e.g. needles and scalpels, remain identifiable after processing.

Patent FR 1 394 418 proposes a processing apparatus that includes a gasification chamber in which the waste is inserted so as to be subjected therein to degassing and to combustion, a chamber for post-combustion of the gases coming from the gasification chamber, and a melting chamber in which the slag from the gasification chamber is melted for vitrification purposes. In that apparatus, the gasification chamber includes a grid beneath which oxidizing agents are directed at a rate which is adjusted so that the organic components of the waste are burned completely prior to the waste being delivered to the melting chamber. Oxidizing agents and fuel are blown into the melting chamber so as to provide flames therein of greater or lesser reducing activity for the purpose, where necessary, of reducing metal oxides and of recovering metal. That known apparatus makes it possible to use waste to produce residues that are usable in the form of granules or of molded parts. Nevertheless, it consumes large quantities of oxidizing agents and of energy for the purpose of burning the waste completely prior to applying it to the melting chamber and reducing the metal oxides. In addition, the use of oxidizing agents in considerable excess gives rise to an equivalent increase in the flow of gases leaving the apparatus and an equivalent increase in the cost of processing said gases for de-pollution purposes.

An object of the present invention is to provide apparatus for processing waste, in particular hospital waste, that enables combustion of the waste to be controlled thoroughly and that also enables it to be transformed into an inert vitrified solid residue that can be made use of subsequently, while avoiding excessive energy consumption and unacceptable overall cost for the installation.

The present invention achieves this object by means of an apparatus of processing waste, in particular hospital waste, the apparatus comprising a gasification chamber into which the waste is inserted in order to be subjected to degassing and to combustion, a post-combustion chamber for the gases coming from the gasification chamber, and a melting chamber in which the slag coming from the gasification chamber is subjected to high temperature for vitrification purposes, means for injecting air into the gasification chamber and into the gas post-combustion chamber, the gasification chamber being above the melting chamber so that the slag moves down into it under gravity to be subjected to melting, the apparatus being characterized in that it includes means for regulating the flow rate of air injected into the gasification chamber so that it matches the calorific value of the waste being processed and so that the content of unburned matter in the slag inserted into the melting chamber lies in the range 3% to 10%.

Unlike known apparatuses, this achieves controlled and incomplete combustion of the waste in the gasification chamber, thereby making it possible, compared with known apparatuses, to reduce both energy consumption and the quantity of air that is injected. It is nevertheless possible to recover vitrified products in which the content of unburned substances is low. In particular, an unburned content of less than 0.1% is achieved when the temperature that obtains in the melting chamber is advantageously about 1600° C. and is preferably obtained by means of a plasma torch. By appropriate regulation of the air flow rate, it is possible to feed the gasification chamber at the beginning of waste combustion with less than enough air, thereby preventing the most combustible and the most volatile components thereof (plastics, alcohols, . . . ) bursting into flame and burning in a manner that would give rise to combustion running away in uncontrollable manner. Thereafter, once the volatile components have been eliminated, combustion can be activated by increasing the air flow rate. The air flow rate thus remains matched to the calorific value of the waste being processed and thus makes it possible to avoid gas appearing in unwanted gusts. By likewise regulating the rate at which air is injected into the post-combustion chamber, it is possible to obtain a substantially constant total flow rate of gas leaving the apparatus and going to processing and/or heat recovery installations. Finally, any excess energy consumption is avoided and the cost of downstream gas processing installations is reduced.

Other characteristics and advantages of the present invention appear on reading the following description of a non-limiting embodiment of the invention and on examining the accompanying drawing which is a fragmentary diagram of processing apparatus of the invention.

BRIEF DESCRIPTION OF THE DRAWINGS

FIG. 1 presents a planar side view portion of the processing apparatus of the invention.

DESCRIPTION OF THE PREFERRED EMBODIMENT

The processing apparatus comprises a gasification chamber 1 into which waste is injected in order to be subjected therein to gasification and to combustion, a post-combustion chamber 2 for post-combustion of the gases coming the gasification chamber 1, and a melting chamber 3 where the slag coming from the gasification chamber 1 is exposed to high temperature for vitrification purposes.

More particularly, waste is inserted into the gasification chamber 1 along arrow D by means of a loader device 10 making it possible to reload the gasification chamber 1 regularly and frequently (e.g. about ten times per hour) without allowing unwanted air to penetrate therein, the device comprising a hopper 11 provided with a closure lid 12. The hopper 11 leads to an intake air-lock 13 fitted with a door 14 giving access to the gasification chamber 1. A pusher 15 driven by an actuator mechanism 16 is adapted to push waste deposited in the airlock 13 into the gasification chamber 1 when the door 14 is open and the lid 12 is closed. The door 14 is preferably mounted to slide vertically and it is actuated by an actuator. As an indication, in the embodiment described, it is associated with a rectangular opening to the gasification chamber 1 having the following dimensions: 1.5 meters (m) ×1.6 m.

The gasification chamber 1 is generally elongate in shape along a horizontal axis and it has a cross-section that is rectangular. The door 14 opens out in an end face of the gasification chamber 1 that is referred to as the "front" face, and that is situated to the right of the drawing. By way of indication, the length of the gasification chamber 1 may be 9 m in the example described and its inside volume may be 57 m$^3$, thereby enabling waste to be processed at a rate of about 2 metric tons per hour (t/h). The inside of the gasification chamber 1 is lined with refractory material in conventional manner. By way of indication, in the example described, the wall 4 of the gasification chamber 1 is constituted by 10 mm thick steel sheet lined on the inside with a thickness of 22 cm of refractory materials. The bottom inside surface of the gasification chamber 1 includes refractory soleplates organized as a staircase, and more particularly in the example described, the gasification chamber 1 includes a first soleplate 21 close to the door 14, followed by second and third soleplates 22 and 23 in a configuration going downwards in steps from the first soleplate 21 and away from the door 14. In the embodiment described, the soleplates are slabs having a side of about 2.5 m. Naturally, depending on the quantity of waste to be processed, it is possible to lengthen or shorten the gasification chamber 1, with the number of soleplates being modified accordingly so as to determine the transit time of the waste. As shown, it is preferable for the bottom of the airlock 13 for loading waste to be situated at the same height as or at a height that is slightly higher than the first soleplate 21 so that during loading newly inserted waste pushes against waste that is already burning on the first soleplate 21 without covering it completely and thus without damping the fire. The waste on the first soleplate 21 is subjected to degassing and the low boiling point materials and liquids contained in the waste evaporate. A primary burner, known per se and not shown, is placed in the vicinity of the first soleplate 21 to cause the first fill to burst into flame and it generally operates only during the first few minutes after the apparatus is put into operation. The end of the gasification chamber 1 remote from the door 14 is fitted with a burner 5 for the purpose, where necessary, of maintaining combustion in the gasification chamber 1 so that the temperature therein remains within the range 600° C. to 900° C. The end of the gasification chamber 1 is fitted with a door (not shown) used for maintenance of the processing apparatus.

Combustion air is delivered into the gasification chamber 1 via lateral openings 70 distributed along the length thereof level with its soleplates. The combustion air is delivered by a conventional fan (not shown) and regulator means are provided to act, in particular, on the rate at which air is injected into the gasification chamber 1 in a manner described below, which air is also referred to as primary air.

The gasification chamber 1 is provided with water sprayers for the purpose of cooling the chamber in the event of its inside temperature becoming too high, e.g. greater than 1000° C.

When the waste reaches the rear end of the first soleplate 21, i.e. the end that is situated to the left in the drawing, it drops onto the soleplate 22 which is situated further down, and subsequently onto the third soleplate 23. By dropping onto a lower soleplate, the waste finds itself dispersed and stirred, thereby enhancing aeration and combustion.

Pushers of refractory material and known per se (not shown and sometimes known as "pokers"), are actuated periodically by actuators (e.g. every 3 minutes to 10 minutes depending on the processing capacity of the installation), and they are mounted between the soleplates on the axis of the gasification chamber 1 to push the waste horizontally away from the door 14, i.e. towards the end of the gasification chamber 1 that is situated to the left in the drawing. These pushers also serve to clean the soleplates, in which case they are extended to the maximum.

The gasification chamber 1 overlies the melting chamber 3 and the slag that results from combustion of the waste in the gasification chamber 1 leaves the last soleplate, i.e. the third soleplate 23 in the embodiment described, via a vertical passage or well 30 so as to fall into the melting chamber 3 where they are subjected to the action of a plasma torch 50 that is known per se.

The gases coming mainly from degassing of the waste in the gasification chamber 1 (and to a smaller extent from the melting chamber 3) leave the gasification chamber 1 upwardly via a passage 40 which is situated in the example described substantially over the third soleplate 23 and which leads to a gas post combustion chamber 2. The end wall of the gasification chamber 1 connecting the well 30 to the passage 40 slopes upwards and forwards, i.e. to the right in the drawing. The post-combustion chamber 2 is elongate in shape along a horizontal axis and the gases are preferably admitted eccentrically relative to said axis so as to impart helical motion to them within the chamber 2. The post-combustion chamber 2 overlies the gasification chamber 1 and it includes lateral opening 75 for admitting combustion air referred to as "secondary air". This air is injected into the combustion chamber 2 in a direction that is likewise selected to impart generally helical motion to the gas, thereby enhancing intimate mixing of the secondary air with the gas coming from the gasification chamber 1. The post-combustion chamber 2 is fitted with a secondary burner 41 actuated, if necessary, to keep the temperature in said chamber above 850° C., and preferably in the range 850° C. to 1200° C. The hot and fully-burned combustion gases leave the post-combustion chamber 2 in the direction of arrow G and are sucked by a fan 60 whose suction rate is controlled so as to maintain a small amount of suction in the post-combustion chamber 2 and in the gasification chamber 1. The burned gases sucked by the fan are applied to a heat recovery boiler and/or to physical or chemical treatment for the gases, for the purpose of eliminating toxic compounds (chlorine, heavy metals, dust, . . . ) contained therein.

The primary air and the secondary air are preferably produced by means of a single fan fitted with distributor flaps enabling the distribution of air delivered to the gasification chamber 1 and to the gas post-combustion chamber 2 to be adjusted while maintaining a total flow rate of air injected into the two chambers which is matched to the calorific value of the waste being processed.

In the example described, the melting chamber 3 is in the form of a crucible (also referred to as a ladle) lined with refractory material, which is generally cylindrical about a vertical axis, and which is fitted with the other-mentioned plasma torch 50 or with any other equivalent device known to the person skilled in the art (electric arc, electrical burner, oxygen burner, . . . ). The melting chamber 3 is fitted with an additional burner 55 for providing initial heating and for preventing excessive cooling of the melting chamber when the torch 50 is not operating. The burner is retractable and it is retracted when the torch is in operation.

The temperature that obtains inside the melting chamber 3 is monitored by optical pyrometry and it is maintained at a reference value (preferably 1600° C.) by modulating the power of the torch 50.

Under the action of the heat generated by the plasma torch 50, the slag poured into the melting chamber 3 melts and forms a melt. An orifice 51 is provided at the bottom of the melt 3 to enable the melt to be evacuated in the direction of arrow L towards a tank 52 that is filled with water and that forms a quenching tank in which the poured melt is subjected to sudden cooling causing it to fragment and form vitrification products. Naturally, without going beyond the ambit of the represent invention, it is possible to propose cooling the melt 3 by any other means known to the person skilled in the art, e.g. by air cooling.

The orifice 51 is fitted with a conventional shutter that is actuated by an actuator (not shown) controlled to cause the melt to be poured cyclically into the quenching tank. In a variant, the orifice 51 may be left open and it may be situated at a height relative to the bottom of the crucible such that the melt is evacuated continuously by overflowing.

The dimensions of the melting chamber are determined relative to the volume of slag poured therein, given that the slag constitutes about 10% to 15% of the incoming volume of waste.

Vitrification products are extracted from the quenching tank 52 by any appropriate means known to the person skilled in the art, e.g. by means of a bucket conveyor 54.

The processor device of the invention operates as follows.

The lid 12 of the hopper 11 is opened and hospital waste packaged in containers of combustible material is dropped into the airlock 13. The lid 12 is closed, the door 14 is opened, and the actuator mechanism 16 is actuated to drive the pusher 15 towards the door 14, thereby expelling the waste contained in the airlock 13 into the gasification chamber 1. Thereafter the pusher 15 is withdrawn, the door 14 closed, and a waste incineration cycle begins.

The cycle begins with a degassing stage which takes place on the first soleplate 21 and during which less than enough combustion air is delivered into the gasification chamber 1 so as to ensure that the most highly combustible and the most volatile components (plastics, alcohols, . . . ) do not burst into flame, since if they were to burn too quickly that would give rise to uncontrolled combustion runaway. The temperature that obtains inside the gasification chamber lies in the range 600° C. to 900° C. The flow rate of primary air preferably corresponds to about 30% of the total air flow rate and the flow rate of secondary air corresponds to about 70%. After a few minutes, the volatile components are eliminated and combustion is activated by increasing the flow rate of primary air, by acting on the above-mentioned flaps, so as to give rise to normal combustion. The flow rate of primary air then preferably reaches 50% of the total air flow rate but it continues to be regulated as a function of temperature and as a function of the suction measured in the gasification chamber 1 and at the outlet from the gas post-combustion chamber 2. The secondary air flow rate is correspondingly reduced to 50%. In the event of combustion beginning to run away, the regulation means detect a rapid increase in pressure in the gasification chamber 1 and reduce the rate at which primary air is injected into the gasification chamber. Water sprayers are automatically brought into operation if the temperature or the pressure reach values that are excessive. These various regulation actions make it possible to control degassing and combustion and to avoid any unwanted gusts of gas appearing, such that the flow rate of gas leaving the apparatus towards installations for further processing and/or heat recovery remains substantially constant.

The combustion waste situated on the first soleplate 21 is pushed away from the odor 14 when the next charge is inserted, thereby falling onto the second soleplate 22. The flow of air injected to the second soleplate 22 and to the following soleplate 23 is regulated in such a manner as to ensure substantially complete combustion of organic waste thereon. Periodically, the refractory pushers situated between the soleplates are actuated to move the waste towards the far end of the gasification chamber 1. The waste pushed in this way from soleplate to soleplate is transformed into slag and it finally drops into the melting chamber 3 via the well 30. The temperature of the slag entering the melting chamber is preferably greater than 800° C. To avoid dust being entrained by the gas leaving the melting chamber 3, the torch 50 is preferably switched off while the pusher on the last soleplate is advancing and causing slag to fall. The slag falls into the melt and it begins itself to melt, and the torch is then put back into operation to complete melting. Periodically, the shutter fitted to the orifice 51 is actuated and the melt pours out from the melt chamber 3 so as to fall into the quenching tank 52 where it solidifies and fragments. The vitrification products are removed from the quenching tank 52 by the conveyor 54.

During combustion and degassing of the waste in the gasification chamber 1, the gas coming therefrom and also the gas coming from the melting chamber 3 is sucked by the fan 60 into the gas post-combustion chamber 2 which is maintained at high temperature (850° C. to 1200° C.), optionally by means of an additional burner 41. At the inlet to the gas post-combustion chamber 2, the gas receives an injection of secondary air causing it to be fully oxidized. The flow rate of secondary air injected into the chamber 2 is continuously regulated by the regulation means which measure the residual oxygen and carbon monoxide content of the gases leaving the chamber 2. The transit time of the gas through the chamber 2 is greater than 2 seconds. The high degree of turbulence that obtains inside the gas post-combustion chamber 2 serves to destroy particles of soot and carbon monoxide, and to dissociate hydrocarbons and chlorine-containing compounds.

The high temperature that obtains in the melting chamber 3 ensures combustion of substantially all of the unburned matter contained in the slag poured into said chamber, thereby making it possible to accept slag having an unburned content lying in the range 3% to 10%, and thus making it possible to accept a relatively short transit time for the waste through the gasification chamber 1 (about 30 minutes), with a high loading of waste per unit area therein (150 kg/m$^2$).

The combined action of the gasification chamber 1 and of the melting chamber 3 makes it possible to obtain an unburned matter content of less than 0.1% in the vitrification products while consuming less energy than would be necessary to obtain the same content of unburned matter using a single gasification chamber 1 (in which the waste would need a longer transit time) or by means of a single (large volume) melting chamber in which the waste would be subjected directly to the action of a (more powerful) plasma torch. The nitrogen oxide content of the gas leaving the apparatus increases with the power of torch used, and said content is reduced in the invention relative to that which would arise from direct vitrification of waste in a large-sized melting chamber fitted with a torch of greater power. In practice, unburned matter is present in trace form in the vitrification products.

In addition, the relatively high content of unburned matter that is acceptable at the outlet from the gasification chamber 1 makes it possible to reduce the excess quantity of air injected into said chamber to about 80% of the value theoretically required for achieving combustion of the waste with less than 3% of residual unburned matter instead of the value of 150% which is generally used in known incinerators. The total flow rate of gas leaving the processor apparatus is thus smaller than that leaving known installations, and consequently it is advantageously possible to make use of installations for treating said gases and/or recovering heat therefrom that are smaller in size and that present higher performance for equivalent cost.

Finally, the processor apparatus of the invention makes it possible to destroy hospital waste by transforming it into inert vitrification products and it also makes it possible, in particular, because of good control of combustion in the gasification chamber and the low torch power used, to ensure that no unburned matter is present (soot, hydrocarbons, carbon monoxide, . . . ) in the gas leaving the apparatus. In addition, waste is destroyed with improved energy efficiency given the low power of the torch used and the relatively high level of unburned matter that can be accepted in the slag.

Naturally, the apparatus of the invention is applicable to processing waste other than hospital waste.

The present invention is not limited to the embodiment described. Thus, for example, without going beyond the ambit of the invention, it is possible to propose replacing the gasification chamber 1 having a staircase of soleplates with a gasification chamber of some other type that enables degassing to be performed and that provides good control of combustion, e.g. a downwardly sloping rotary gasification chamber.

We claim:

1. Apparatus of processing waste, in particular hospital waste, the apparatus comprising a gasification chamber into which the waste is inserted in order to be subjected to degassing and to combustion, a post-combustion chamber for the gases coming from the gasification chamber, and a melting chamber in which the slag coming from the gasification chamber is subjected to high temperature for vitrification purposes, means for injecting air into the gasification chamber and into the gas post-combustion chamber, the gasification chamber being above the melting chamber so that the slag moves down into it under gravity to be subjected to melting, the apparatus being characterized in that it includes means for measuring the temperature and the pressure in the gasification chamber and for regulating the flow rate of air injected into the gasification chamber as a function of the measured temperature and pressure so that the flow rate matches the calorific value of the waste being processed and so that the content of unburned matter in the slag inserted into the melting chamber lies in the range 3% to 10%.

2. Waste processing apparatus of claim 1, wherein the flow rate of air injected into the gasification chamber and the flow rate of air injected into the post-combustion chamber are regulated so that the flow rate of air leaving the apparatus for feeding to installations for processing gas and/or recovering heat is substantially constant.

3. Waste processing apparatus of claim 1 or 2, wherein the gasification chamber is constituted by a downwardly sloping rotary chamber.

4. Waste processing apparatus of claim 1 or 2, wherein the gasification chamber includes soleplates on its bottom inside surface that are disposed in a staircase configuration and on which waste spends time in succession, the soleplates being fitted with waste advancing pushers.

5. Waste processing apparatus of claims 1 or 2, wherein the chamber of the melting chamber is maintained at a reference value.

6. Waste processing apparatus of claims 1 or 2, wherein the melting chamber includes an orifice fitted with a shutter for enabling the melt to be discharged to a quenching tank.

7. Waste processing apparatus of claims 1 or 2, wherein the temperature of the gas post-combustion chamber lies in the range 850° C. to 1200° C.

8. Waste processing apparatus of claims 1 or 2, wherein the air injected into the gasification chamber and into the gas post-combustion chamber is obtained from a single fan.

9. Waste processing apparatus of claims 1 or 2, wherein the flow rate of primary air injected into the gasification chamber lies in the range 30% to 50% of the total injected air flow rate, and the flow rate of secondary air injected into the post-combustion chamber lies in the range 50% to 70% of the total injected air flow rate, the secondary air flow rate being at a maximum at the beginning of waste processing and the primary air flow rate being at a maximum at the end of waste degassing.

10. Waste processing apparatus of claims 1 or 2, wherein the total injected air flow rate corresponds to air being 80% in excess over the theoretical quantity required for ensuring combustion of the waste, with less than 3% of residual unburned matter.

11. Waste processing apparatus of claims 1 or 2, wherein the unburned matter content of the vitrification products is less than 0.1%.

12. Waste processing apparatus of claims 1 or 2, wherein the temperature of the slag on being inserted into the melting chamber is greater than 800° C.

* * * * *